(12) United States Patent
Desai et al.

(10) Patent No.: US 11,372,831 B2
(45) Date of Patent: Jun. 28, 2022

(54) MANAGING LARGE SCALE ASSOCIATION SETS USING OPTIMIZED BIT MAP REPRESENTATIONS

(71) Applicant: International Business Machines Corporation, Armonk, NY (US)

(72) Inventors: Rajesh M. Desai, San Jose, CA (US); Magesh Jayapandian, San Jose, CA (US); Iun V. Leong, Union City, CA (US); Justo L. Perez, Salinas, CA (US); Roger C. Raphael, San Jose, CA (US); Gabriel Valencia, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/524,309

(22) Filed: Jul. 29, 2019

(65) Prior Publication Data

US 2019/0354514 A1 Nov. 21, 2019

Related U.S. Application Data

(63) Continuation of application No. 15/459,372, filed on Mar. 15, 2017, now Pat. No. 10,452,631.

(51) Int. Cl.
*G06F 16/22* (2019.01)
*G06F 16/2455* (2019.01)

(52) U.S. Cl.
CPC ...... *G06F 16/2237* (2019.01); *G06F 16/2455* (2019.01)

(58) Field of Classification Search
CPC .............................. G06F 16/2237; G06F 16/20
See application file for complete search history.

(56) References Cited

U.S. PATENT DOCUMENTS

| 5,790,848 | A | * | 8/1998 | Wlaschin | .............. | G06F 16/176 |
| | | | | | | 707/661 |
| 8,396,838 | B2 | | 3/2013 | Brockway et al. | | |

(Continued)

FOREIGN PATENT DOCUMENTS

| JP | 2002-157227 A | 5/2002 |
| JP | 2002-528821 A | 9/2002 |

(Continued)

OTHER PUBLICATIONS

PCT International Search Report and Written Opinion of the International Searching Authority, PCT/IB2018/051028, dated Jun. 1, 2018, 10 pages.

(Continued)

*Primary Examiner* — James Trujillo
*Assistant Examiner* — J Mitchell Curran
(74) *Attorney, Agent, or Firm* — Edell, Shapiro & Finnan, LLC

(57) ABSTRACT

Processing a database query for sets of data includes assigning a unique identifier from an integer space to each entity within data and creating one or more sets of entities each pertaining to a corresponding entity within the data. A representation is then generated on disk for each set of entities, wherein each representation encompasses and is suited for a range of the unique identifiers of entities within a corresponding set and indicates a presence of an entity within that corresponding set. Finally, a query is processed based on the representation for each set of entities to retrieve data satisfying the query, wherein the representation provides a constant time for association and dissociation operations that are append-only operations with deferred merge and automatic filtering of deleted and duplicate entities at query time.

21 Claims, 14 Drawing Sheets

(56) References Cited

U.S. PATENT DOCUMENTS

| | | |
|---|---|---|
| 8,577,908 B2 | 11/2013 | Dettinger et al. |
| 8,620,880 B2 | 12/2013 | Kashiwagi et al. |
| 9,275,129 B2 | 3/2016 | Desai et al. |
| 2007/0150489 A1 | 6/2007 | Dettinger et al. |
| 2007/0271573 A1* | 11/2007 | Chandrasekaran ..... G06F 9/542 |
| | | 719/318 |
| 2008/0059420 A1* | 3/2008 | Hsu .......................... G06F 21/64 |
| 2011/0010330 A1* | 1/2011 | McCline ............ G06F 16/1865 |
| | | 707/602 |
| 2015/0039558 A1 | 2/2015 | Yamada |
| 2015/0055867 A1 | 2/2015 | Wade et al. |
| 2016/0321376 A1* | 11/2016 | Taylor .................. G06F 16/9024 |
| 2018/0025042 A1* | 1/2018 | Fischer ............... G06F 16/2455 |
| | | 707/625 |
| 2018/0268009 A1 | 9/2018 | Desai et al. |

FOREIGN PATENT DOCUMENTS

| | | |
|---|---|---|
| WO | 2010003061 | 1/2007 |
| WO | 2009/144941 A1 | 12/2009 |
| WO | 2013/157099 A1 | 10/2013 |

OTHER PUBLICATIONS

List of IBM Patents or Patent Applications Treated as Related, filed Jul. 29, 2019.

English translation of Notice of Reasons for Refusal in Japanese Patent Application No. 2019-548553, dated Jul. 15, 2021, 4 pages.

* cited by examiner

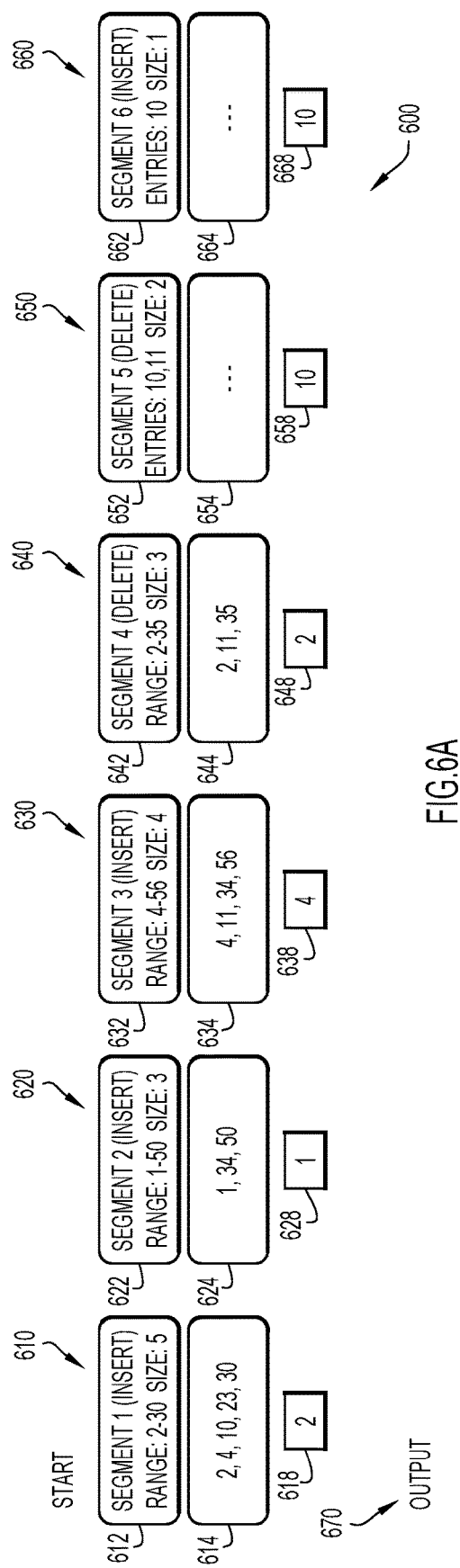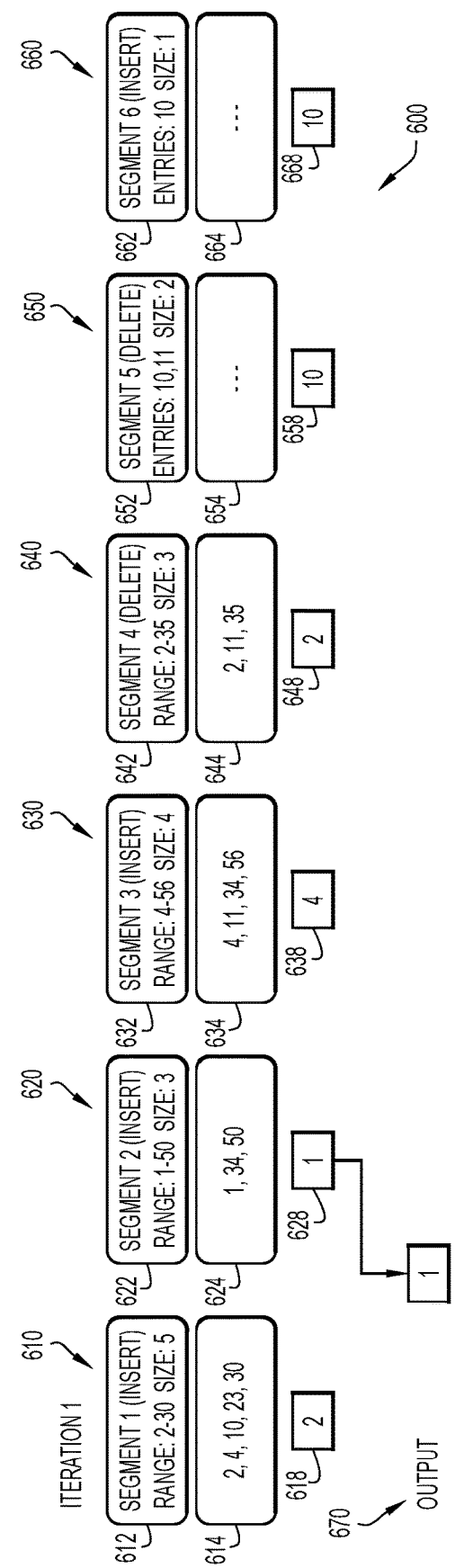

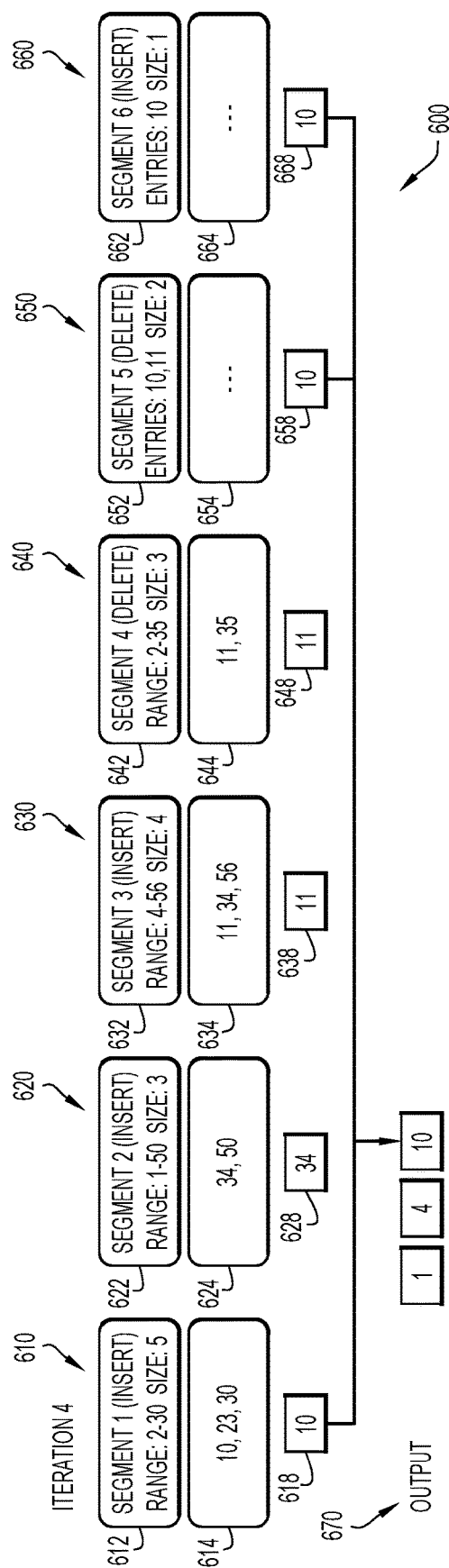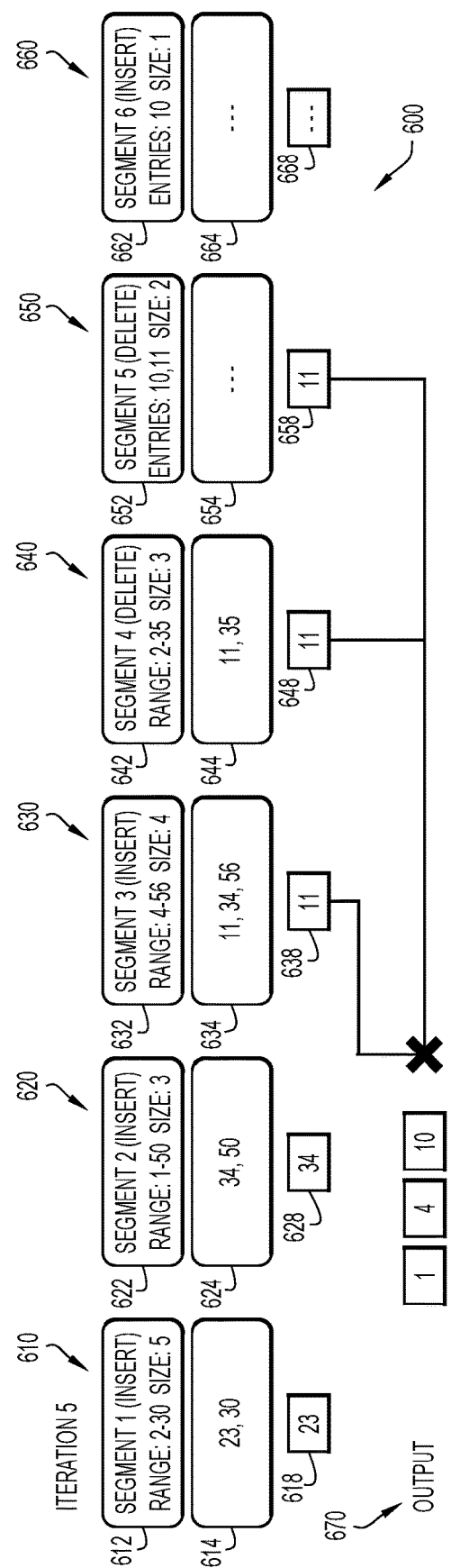
FIG.6E
FIG.6F

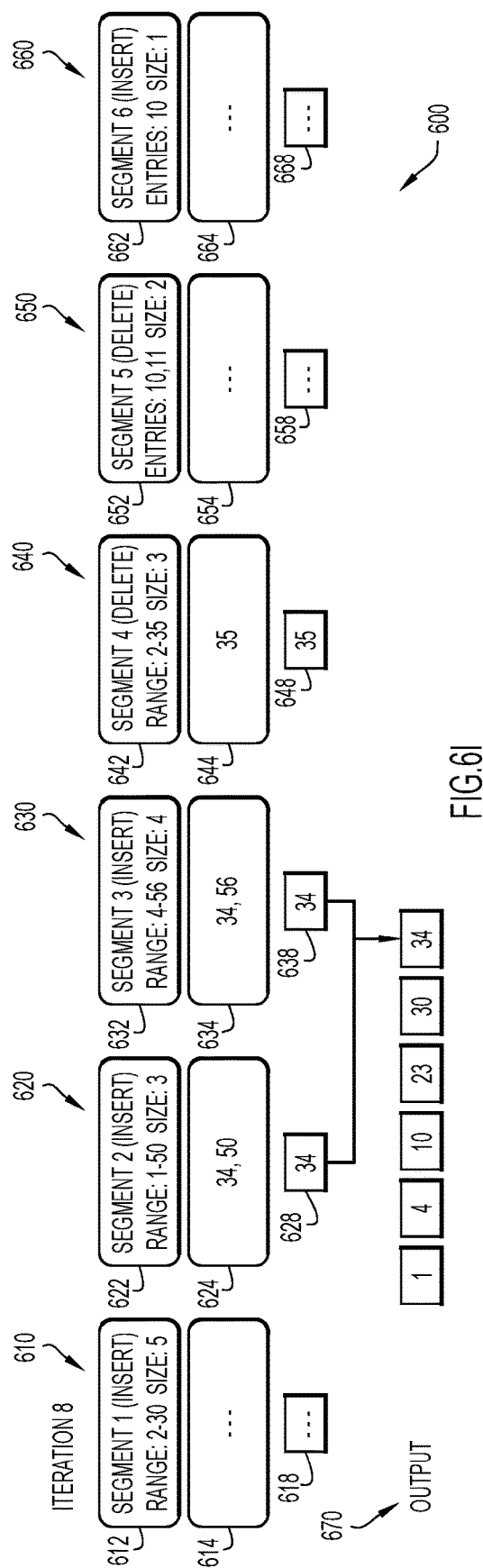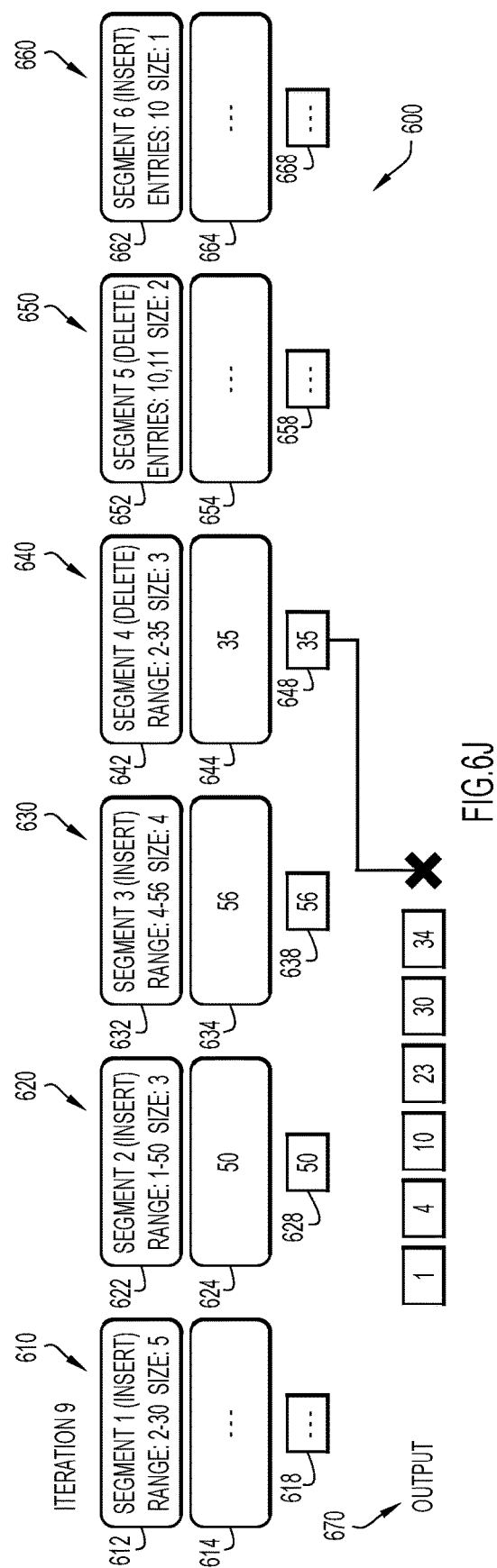
FIG.6I
FIG.6J

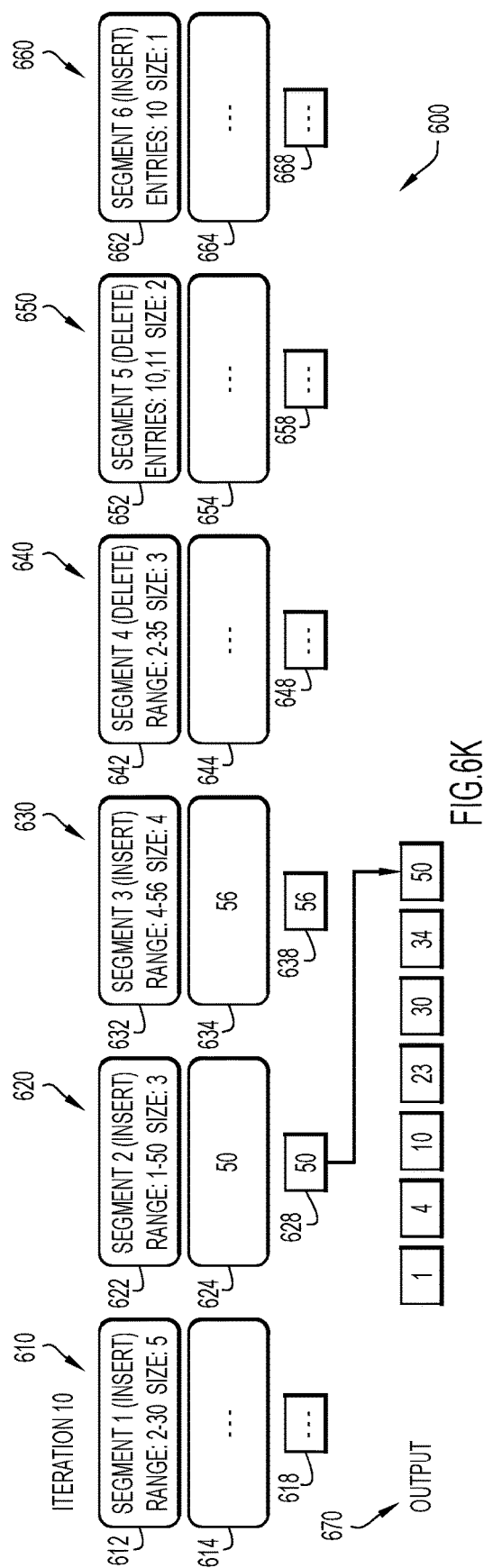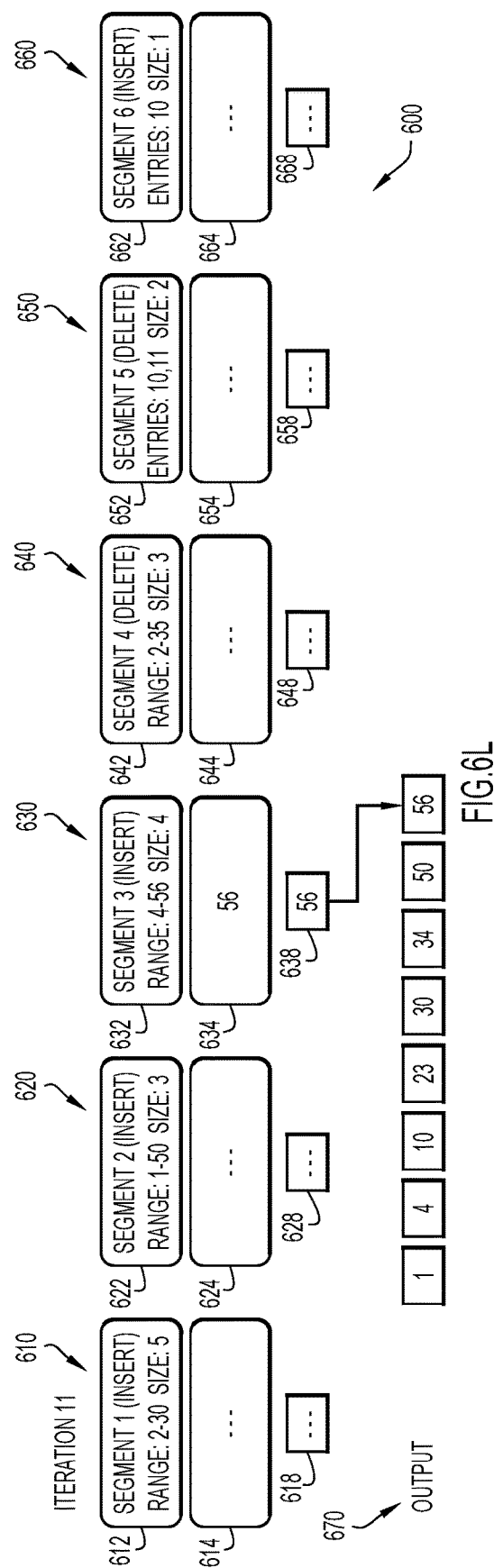

MANAGING LARGE SCALE ASSOCIATION SETS USING OPTIMIZED BIT MAP REPRESENTATIONS

BACKGROUND

1. Technical Field

Present invention embodiments relate to association and dissociation data sets, and more specifically, the management of association and dissociation data sets with bitmap representations.

2. Discussion of the Related Art

A common problem in enterprise content management is that of associating large sets of entities of a first type with entities of one or more second types. For example, in the legal domain, companies or organizations often need to associate large sets of documents (e.g. emails, reports, notices, memos, etc.) with large sets of people (e.g. employees, contractors, managers, etc.) or one or more other entities (e.g. legal matters, audits, organizational units, etc.).

An association set is a one-to-many or many-to-many relationship between two entities. For example, employees send and receive emails that can be modeled as an association between employees and documents. Here the set of all documents associated with an employee can be viewed as an association set. The set of all senders and recipients of an email can also be viewed as an association set. If a company is involved in some kind of litigation and is required to produce all documents associated with a set of employees (or "persons of interest" with regards to the litigation), producing the required set of documents requires that the associations be modeled and persisted in a manner that makes retrieving the desired documents both fast and accurate.

Association sets can be tedious to manage once they become very large, which is often the case for large companies with hundreds of thousands of employees and hundreds of millions of documents. Thus, for large companies, the number of documents, legal matters, custodians, notices, etc. can be very large, and the number of associations between them may be even larger. Storing and querying these association sets are difficult challenges in modern enterprises and require solutions capable of correctly and efficiently being performed at large scale.

In typical solutions, a first identification number is used to represent an entity, while a second identification number may be used to track each of its associations with other entities. For example, an association between an email and an employee can be modeled as a relationship between the ID of the email and the ID of the employee. But this can lead to a very large number of relationships resulting in a very large number of relationship objects that need to be stored, managed, retrieved, and queried during various phases of a discovery process. Managing, storing, retrieving, and querying these large relationship objects can be very expensive. For large companies or organizations with tens of thousands of employees and millions of documents, the size of association sets become very large. Persistence of these large association sets could take up vast amounts of storage if traditional means are employed.

In addition to the cost of storage, there is also a cost in terms of time taken to create and manage these associations. If the creation of associations is done using transactions, the locks that would need to be held during materialization could make the system unusable for other operations that may need to happen concurrently (e.g., adding or removing entities from an association set).

In addition, directly related to the problem of storage of large association sets is the problem of retrieving associations of interest from among numerous others. To query n-ary associations, an n-way join of binary association sets may be required. This requires a solution that is fast, flexible and scalable.

Traditional database storage uses tables of links to represent and query associations between entities. Storing, indexing and querying associations in this manner is not optimal and may result in long response times for user queries involving associations, especially if associations are being created and managed at the same time. If transactional guarantees are provided, much of the database may be unusable while a creation or deletion operation is taking place, which can make the entire system largely unusable, even for read-only queries, for hours, if not days.

For example, a company facing litigation will typically need to gather data relevant to the case. This often requires creating a case, associating a large number of (relevant) documents and placing these, potentially millions of, documents on hold. In the same transaction, a large number of custodians may also need to be associated with the case. Managing such a transaction in a way that the system can be rolled back in the event of an error can be very challenging. Similarly, if a case needs to be deleted, the same transaction could involve dissociating a large number of documents and custodians from the case and releasing any holds. To do so efficiently, while guaranteeing transactional semantics, is difficult.

Associations can be created, modified over time, and even removed if the life of a document exceeds its statute of limitations (e.g., depending on federal laws, state laws, local municipality laws, company policies, etc.). Thus, managing these association sets needs to be able to handle such changes over time without significantly lowering query performance.

SUMMARY

According to one embodiment of the present invention, processing a database query for sets of data includes assigning a unique identifier from an integer space to each entity within data and creating one or more sets of entities each pertaining to a corresponding entity within the data. Furthermore, a representation of each set of entities is generated on disk, wherein each representation encompasses and is suited for a range of the unique identifiers of entities within a corresponding set and indicates a presence of an entity within that corresponding set. A query is processed based on the representation for each set of entities to retrieve data satisfying the query, wherein the representation provides a constant time for association and dissociation operations that are append-only operations with deferred merge and automatic filtering of deleted and duplicate entities at query time. Embodiments of the present invention further include a system and computer program product for processing a database query for sets of data in substantially the same manner described above.

According to present invention embodiments, an entity represents one or more instances from a group of a person, a document, an event, and an object. The at least one set of entities of the present invention embodiments may include entities associated with a specific entity and/or entities dissociated with a specific entity. Moreover, a set of entities of the present invention embodiments includes a multi-set containing non-unique entities with duplicate entity identifiers preserved in a physical representation of the set of entities, and wherein the query requests the set or multi-set representation. Present invention embodiments provide that the metadata for each entity identifier of a segment of a set of entities may be stored inline with the segment as a payload.

Present invention embodiments partition a set of entities represented by entity identifiers into a plurality of segments, wherein content of each segment and metadata for each segment is stored in separate data objects. Furthermore, each segment is one of an insert type to indicate association and a delete type to indicate dissociation, and a segment size is based on a request size, compression type, and run-time optimizations. In addition, the plurality of segments are chronologically ordered and used to generate content of the set of entities by merging, inserting, and deleting segments. The present invention embodiments perform operations on the plurality of segments concurrently. Moreover, when processing the query, the present invention embodiments evaluate the query for the plurality of segments and combining results from each of the evaluated segments.

BRIEF DESCRIPTION OF THE DRAWINGS

Generally, like reference numerals in the various figures are utilized to designate like components.

FIGS. 6A-6M are a series of schematic diagrams illustrating the retrieval of an association set according to an embodiment of the present invention.

Like reference numerals have been used to identify like elements throughout this disclosure.

DETAILED DESCRIPTION

Presented herein are techniques for processing a database query for sets of data, including association and dissociation sets of data. Generally, the techniques provided herein assign and represent each entity of a dataset with a unique integer. According to the techniques provided herein, each entity is assigned to a series of association sets, where each association set is represented as a bitmap over an integer space that covers the range of entity identifiers that could possibly belong to the association set. A blocking structure is used for each association set to partition the association set into a series of blocks or segments, where each segment is stored based on how the identifiers of the entities of the segment are distributed in the integer space. Segments with a high number of associated entities (i.e., dense segments) can be stored using physical bitmaps, while segments with a low number of associated entities (i.e., segments that are more sparse and have fewer identifiers) can be stored in other ways (e.g., storing of the actual entity identifiers).

These techniques create a more efficient and less time consuming manner of navigating and retrieving the entities of an association set of a dataset of a system. Moreover, the techniques provided herein creates a storage of large association sets that is scalable. The techniques provided herein provide a cheaper method of storing and retrieving association sets compared with that of traditional link table database storage. Furthermore, the techniques provided herein enable a fast retrieval of association sets. Lastly, the techniques provided herein allow operations (e.g., creation, deletion, movement, merging, querying, etc.) of segments to occur concurrently without having to lock entire association sets, which improves overall throughput, performance, and functionality of the storage system.

Figure 1:
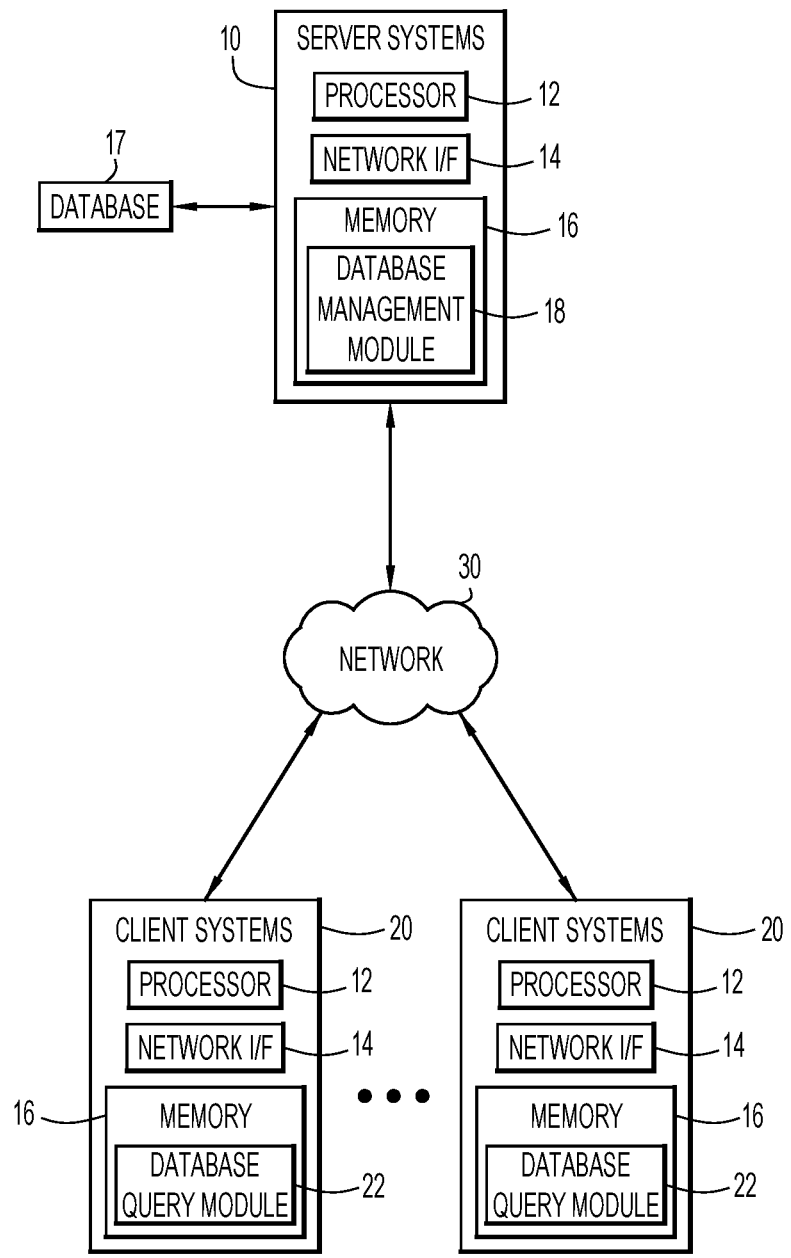
FIG. 1 illustrates an example environment in which the present general inventive concept can be embodied.

An example computing environment for use with present invention embodiments is illustrated in FIG. 1. Specifically, the computing environment includes one or more server systems 10, and one or more client systems 20. Server systems 10 and client systems 20 may be remote from each other and communicate over a network 30. The network may be implemented by any number of any suitable communications media (e.g., wide area network (WAN), local area network (LAN), Internet, Intranet, etc.). Alternatively, server systems 10 and client systems 20 may be local to each other, and communicate via any appropriate local communication medium (e.g., local area network (LAN), hardwire, wireless link, Intranet, etc.).

Server systems 10 may be implemented by any conventional or other computer systems preferably equipped with a display or monitor, a base (e.g., including at least one CPU or processor 12, one or more memories 16, and/or internal or external network interfaces or communications devices 14 (e.g., modem, network cards, etc.)), optional input devices (e.g., a keyboard, mouse or other input device), and any commercially available and custom software (e.g., server/communications software, database management module 18, etc.).

Client systems 20 may be preferably equipped with at least one CPU or processor 12, one or more memories 16, internal or external network interfaces or communications devices 14 (e.g., transceiver, network cards, etc.)), and/or optional input or output devices (e.g., a keyboard, mouse or other input device, a display, etc.). The client systems 20 may further include any commercially available or custom software and/or hardware modules for the particular device to perform device operations (e.g., applications, browser, communications software, database query module 22, etc.). Client systems 20 may communicate with server systems 10 for processing a database query for sets of data.

Database query module 22 enable users of the client systems 20 to submit requests or queries to server systems 10 for sets of data stored by the server systems 10 on the databases 17. The server systems 10 include a database management module 18 to build and manage a database 17 of association sets for the dataset of a system. One or more databases 17 may store various types of information (e.g., association sets, entity identification or identifiers for each entity of a dataset, metadata of the association sets, etc.). The database 17 may be implemented by any conventional storage unit, may be local to, or remote from, server systems 10 and client systems 20, and may communicate via any appropriate communication medium (e.g., local area network (LAN), wide area network (WAN), Internet, hardwire, wireless link, Intranet, etc.). The client systems 20 may present a graphical user interface (e.g., GUI, etc.) or other type of interface (e.g., command line prompts, menu screens, etc.) to send database queries to the server systems 10, and may provide various types of information, including the entities of an association set.

The database management module 18 is configured to model and track association sets (e.g., both associations and disassociations of entities of a system). The database management module 18 may assign each entity of a system a unique integer, where the unique integer serves as an identification key, identifier, or identity. Any size integer may be utilized by the database management module 18. However, in one example embodiment of the present invention, a unique 64-bit integer may be assigned to each entity of the dataset of a system. The entities of a dataset include, but are not limited to, documents, people, objects of a system, and matters of a system. For example, documents include, but are not limited to, emails, reports, notices, memos, etc. of a system. People of a system include, but are not limited to, employees, contractors, and managers of a company that owns and operates the system. Matters of a system include, but are not limited to, legal matters, audits, and organizational units, of a company that owns and operates the system.

Once the database management module 18 assigns each entity of a system with an identifier, the database management module 18 builds association sets, which are groups of entities that share the same type of relationship or association with one another. For example, employees send and receive emails which can be modeled as an association between employees and documents. According to this example, all of the documents associated with a specific employee may be grouped together and serve as one association set. Furthermore, the senders and recipients of the emails may also be grouped together and server as another association set. The database management module 18 may represent each association set as a bitmap over an integer space that covers the range of entity identifiers that could belong to the association set. For example, the set of persons of the system associated with a legal matter of the organization that owns and operates the system can be represented as a relationship between a legal matter identifier and a person bitmap, where bits are set for each person associated with the legal matter. In one embodiment of the present invention, and as further illustrated and explained below, the association sets may be partitioned by a blocking structure, where an association set is partitioned or divided into a plurality of blocks or segments. This provides faster access and scalability to each association set by the database management module 18 of the server systems 10 when the server systems 10 receive a database query from the client systems 20.

Modules 18, 22 may include one or more modules or units to perform the various functions of the present invention embodiments described below. The various modules (e.g., database management module 18, database query module 22, etc.) may be implemented by any combination of any quantity of software and/or hardware modules or units, and may reside within memory 30 of the server system 10 and/or client systems 20 for execution by processor 12.

Figure 2:
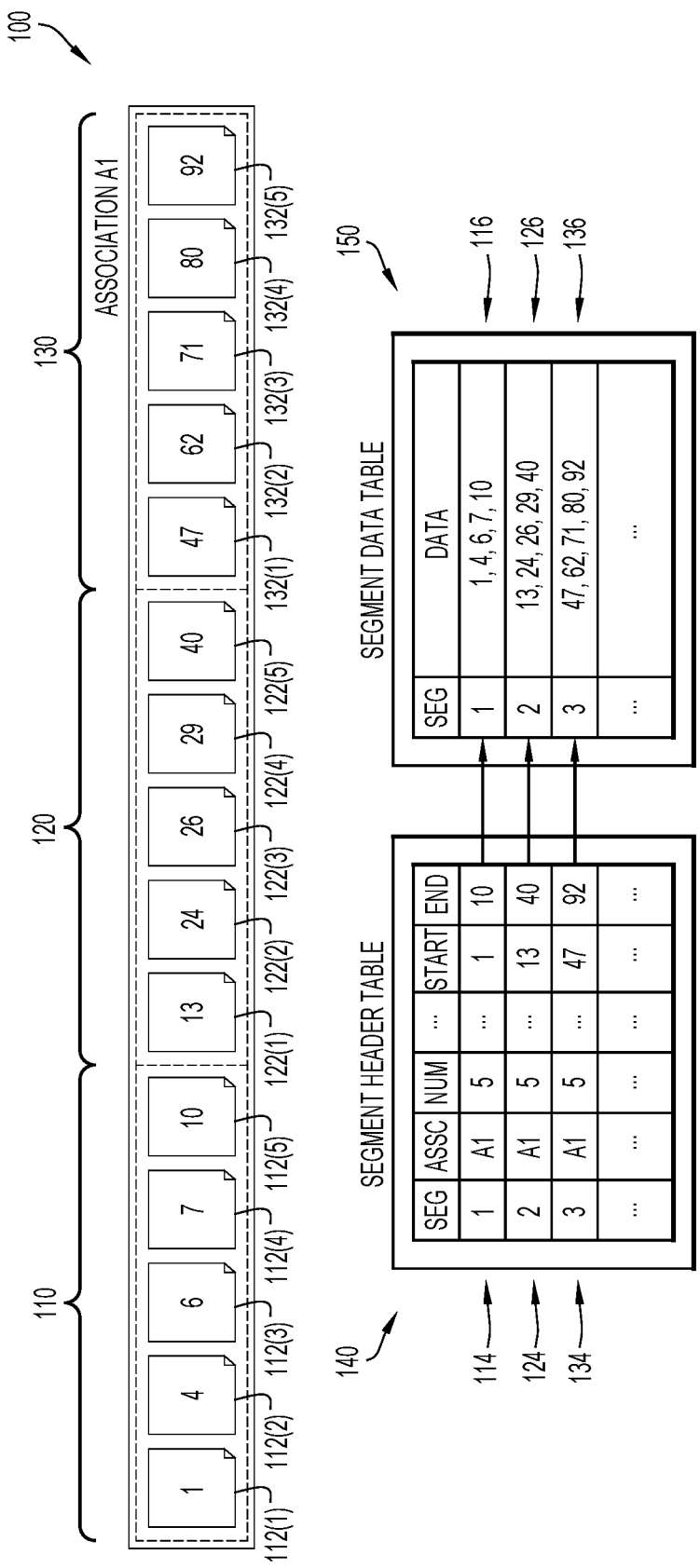
FIG. 2 is a schematic diagram representing an association set of data according to an embodiment of the present invention.

Referring now to FIG. 2, a schematic diagram of an example of an association set 100 stored in database 17 is shown. As illustrated, each association set 100 comprises a set of tables. The representation of the association set 100 illustrated includes three segments 110, 120, 130. While the example embodiment illustrated in FIG. 2 is illustrated with three segments, other embodiments of the association set 100 may be stored with any number of segments. Each of the segments 110, 120, 130 includes five entities 112(1)-112(5), 122(1)-122(5), 132(1)-132(5), respectively. As illustrated, segment 110 includes first entity 112(1) that is assigned identifier 1, second entity 112(2) that is assigned identifier 4, third entity 112(3) that is assigned identifier 6, fourth entity 112(4) that is assigned identifier 7, and fifth entity 112(5) that is assigned identifier 10. Segment 120 includes first entity 122(1) that is assigned identifier 13, second entity 122(2) that is assigned identifier 24, third entity 122(3) that is assigned identifier 26, fourth entity 122(4) that is assigned identifier 29, and fifth entity 122(5) that is assigned identifier 40. Finally, segment 130 includes first entity 132(1) that is assigned identifier 47, second entity 132(2) that is assigned identifier 62, third entity 132(3) that is assigned identifier 71, fourth entity 132(4) that is assigned identifier 80, and fifth entity 132(5) that is assigned identifier 92. While each segment 110, 120, 130 of the association set 100 contains five entities, other embodiments of other association sets may include segments that contain more or less than five entities.

The example embodiment of the association set 100 of FIG. 2 illustrates that the association set 100 includes a segment header table 140 and a segment data table 150. Segment data table 150 stores the content of each segment 110, 120, 130 (i.e., the entities of each segment). Segment header table 140 stores metadata about the segments 110, 120, 130. In some embodiments, the segment header table 140 includes, for each segment 110, 120, 130, the start ID of the entities, the end ID of the entities, the compression type, cardinality, and the state of the segment. In the segment header table 140, each segment 110, 120, 130 is represented as a different row 114, 124, 134, respectively. Furthermore, the rows 114, 124, 134 of the segment header table 140 may align with their respective row 116, 126, 136 of the segment data table 150. The first row 116 of the segment data table 150 stores the identifiers of the entities 112(1)-112(5) of the first segment 110. The second row 126 of the segment data table 150 stores the identifiers of the entities 122(1)-122(5) of the second segment 120, and the third row 136 of the segment data table 150 stores the identifiers of the entities 132(1)-132(5).

In other embodiments, association sets 100 may include other metadata in addition to the identifiers of participating entities 112(1)-112(5), 122(1)-122(5), 132(1)-132(5), where there is a need to store this additional metadata. For instances where the metadata is small in size, (i.e., the date of the association of an entity to the association set 100, the time the when entities are associated with one another, etc.), the metadata can be stored inline with the association set using a payload. Inline metadata are co-located with the data to avoid the additional overhead of retrieving them from elsewhere on disk (e.g., input/output). For example, when documents are associated with folders in an application, and the application wants to record when each document was associated to a folder, the date and/or time that each document was associated to a folder can be stored in payloads within the association set 100. This enables queries for the association date to be evaluated quickly since no additional disk seek is required.

Conversely, when the additional metadata is large, the additional metadata can be stored collectively in a parallel segment of the association 100. An example of large metadata includes when an application is involved with legal matters and custodians allow a comment or description to be stored along with each association between the legal matter and a custodian. In this example, storing a large text field as a payload would make the association set too cumbersome and costly. Thus, the additional large metadata could be stored as a separate parallel segment.

In addition, when an association set 100 is relatively small, the association set 100 may not require a separate table to store the associated entities. Thus, both the entity and its entire association set, which includes any small metadata, may be stored in a single table. An example of a small association set 100 may be the senders and the recipients associated with each email, as these association sets 100 are typically small and immutable.

An additional type of association set 100 may occur when a need exists to store multiple instances of the same entity identifier in a single association set 100. Typically, an association set 100 includes sets of distinct entities 112(1)-112(5), 122(1)-122(5), 132(1)-132(5) (i.e., no entity occurs more than once). Multiple instances of the same entity identifier may be stored in an association set 100 when an entity participates in a relationship multiple times and the cardinality of its participation is of importance and needs to be captured. For example, a hold may be placed on one or more documents of an association set, where a document cannot be deleted if there is at least one hold request on it. An association set 100 that represents the set of documents on hold could have multiple instances of a single document (i.e., multiple instances of an identifier of an entity) if it is included in more than one hold request. In another embodiment, instead of storing multiple occurrences of a single identifier in the association set 100, a reference count can be associated with each identifier that requires multiple instances to be stored. For the example of an association set 100 for documents placed on hold, the reference count for an identifier in that hold association set may be incremented for each hold requested and placed on a specific document that was assigned the identifier. Furthermore, if a hold is released, the reference count may be decremented. The entity identifier may be removed only when the reference count reaches a value of zero.

Figure 3A:
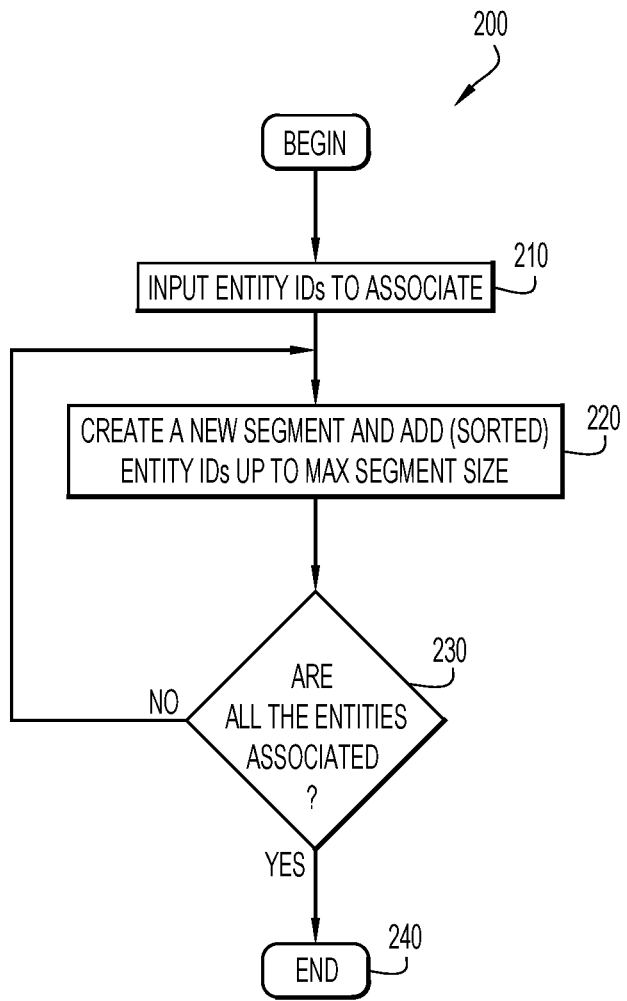
FIG. 3A is a procedural flow chart of the creation of a new segment adding associated entities in an association set according to an embodiment of the present invention.
Figure 3B:
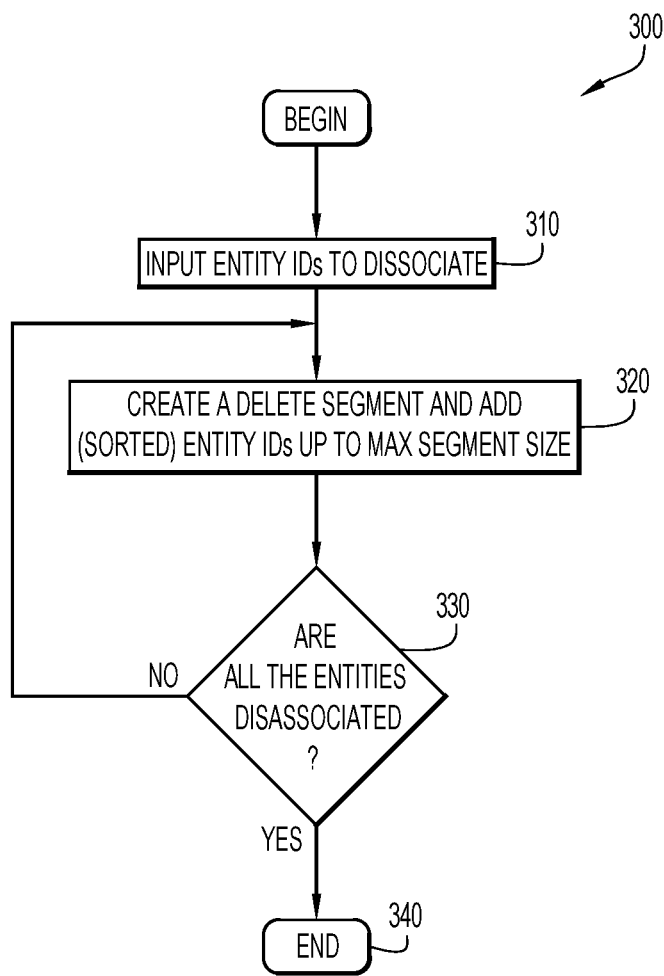
FIG. 3B is a procedural flow chart of the creation of a new segment adding dissociation entities in an association set according to an embodiment of the present invention.

With reference now to FIGS. 3A and 3B, procedural flowcharts 200, 300 depict operations (e.g., of the database management module 18) for building or managing an association set 100. Each segment 110, 120, 130 of an association set 100 may represent a series of entities to be associated or dissociated with an association set 100. While association segments serve as a list of entity identifiers that are associated with an entity (e.g., added to the association set), dissociation sets capture the entity identifiers that have been dissociated with an entity (i.e., entity identifiers that were once associated and then became dissociated with an entity; entity identifiers that are to be removed from the association set). For example, if entities are deleted from the system, all of their associations must be deleted as well (i.e., the respective entities must be dissociated from an association set). The association segments may be labeled as associations, "INSERT," or "NEW," while dissociation segments may be labeled as dissociations or "DELETE." Thus, there is no need to remove any segment in an association set 100, and each segment 110, 120, 130 of an association set 100 operates as a list or ledger for the entities that have been added or deleted from the association set 100 based on how the segments 110, 120, 130 have been labeled. In one example embodiment, dissociation segments may be represented using a bit mask or bloom filter. In another example embodiment, as further detailed below, dissociation segments may be implemented using priority queues, where priority of the segments 110, 120, 130 of an association set 100 is determined by a reverse chronology (i.e., the more recent a segment, whether an association or dissociation segment, the higher in priority that segment will be).

Moreover, the segments 110, 120, 130 of an association set 100 may be fixed to a certain amount of entities. For the example embodiment of the association set 100 illustrated in FIG. 1, the segments 110, 120, 130 are limited to five entities. However, other association sets 100 may contain segments that include any number of set entities. Furthermore, segments 110, 120, 130 may be assigned a state. States of segments 110, 120, 130 include, but are not limited to, "NEW," "DELETE," "MERGED," "IN PROGRESS," and "LOCK." These states may be further detailed below.

As illustrated in FIG. 3A, the database management module 18 initially, at step 210, collects and inputs the entity identifiers of entities to be associated with an association set. At step 220, the database management module 18 creates a new segment for the association set 100 and adds the entity identifiers to the new segment until the maximum amount of entity identifiers are added to the segment. Furthermore, the database management module 18 may sort the entity identifiers (i.e., in chronological order) to be added to the association set prior to adding the entity identifiers to the segments. Furthermore, each new segment to which entity identifiers are added will be assigned a "NEW" state. After the maximum amount of entity identifiers have been added to a segment, at step 230, the database management module 18 determines if all of the entity identifiers received at step 210 have been associated with the association set. If, at step 230, the database management module 18 determines that all of the entity identifiers received at step 210 have not been associated with the association set, the database management module 18 returns to step 220 to create an additional segment and add the remaining entity identifiers to the segment. However, if, at step 230, the database management module 18 determines that all of the entities received at step 210 have been associated with the association set, the database management module 18, at step 240, stops adding entity identifiers to association segments and stops adding association segments to the association set.

As illustrated in FIG. 3B, the database management module 18 initially, at step 310, collects and inputs the entity identifiers of entities to be dissociated with an association set. At step 320, the database management module 18 creates a new segment for the association set and adds the entity identifiers to the new segment until the maximum amount of entity identifiers are added to the segment. Furthermore, the database management module 18 may sort the entity identifiers (i.e., in numerical order) to be added to the association set prior to adding the entity identifiers to the segments. Furthermore, each new segment to which entity identifiers are added will be assigned a "DELETE" state. After the maximum amount of entity identifiers have been added to a segment, at step 330, the database management module 18 determines if all of the entity identifiers received at step 310 have been dissociated with the association set. If, at step 330, the database management module 18 determines that all of the entity identifiers received at step 310 have not been dissociated with the association set, the database management module 18 returns to step 320 to create a new segment and adds the remaining entity identifiers to the segment. However, if, at step 330, the database management module 18 determines that all of the entities received at step 310 have been dissociated with the association set, the database management module 18, at step 340, stops adding entity identifiers to dissociation segments and stops adding dissociation segments to the association set.

In some example embodiments, deleted entities from the system could potentially have been part of numerous associations, which makes deletion a very expensive operation (i.e., bulk deletion) for traditional association set structures. The present invention embodiments enables the deleted entity identifiers to be added to a single set, such as a global deletion set, rather than requiring each deleted entity identifier from each association set individually. Whenever associations are queried or otherwise retrieved, the results or output are post-filtered with the entities of the global deletion set so they are correctly excluded from the query results. This enables dissociations to scale much more efficiently than traditional approaches.

While the entity identifiers added to an association segment or disassociation segment need not be in chronological order (but the entity identifiers need to be in numerical order within the association or disassociation segment), the association or disassociation segments are ordered chronologically within the association set 100. Periodically dissociation segments may be applied to an association set 100 asynchronously by the database management module 18 using a background process called a background merger thread. A background merger thread aligns the segments 110, 120, 130 of an association set 100 in a manner that optimizes storage and query performance. A background merger thread enables the database management module 18 to perform multiple tasks (i.e., computing and caching segment sizes) while merging segments 110, 120, 130 to amortize costs and improve system performance.

Figure 4:
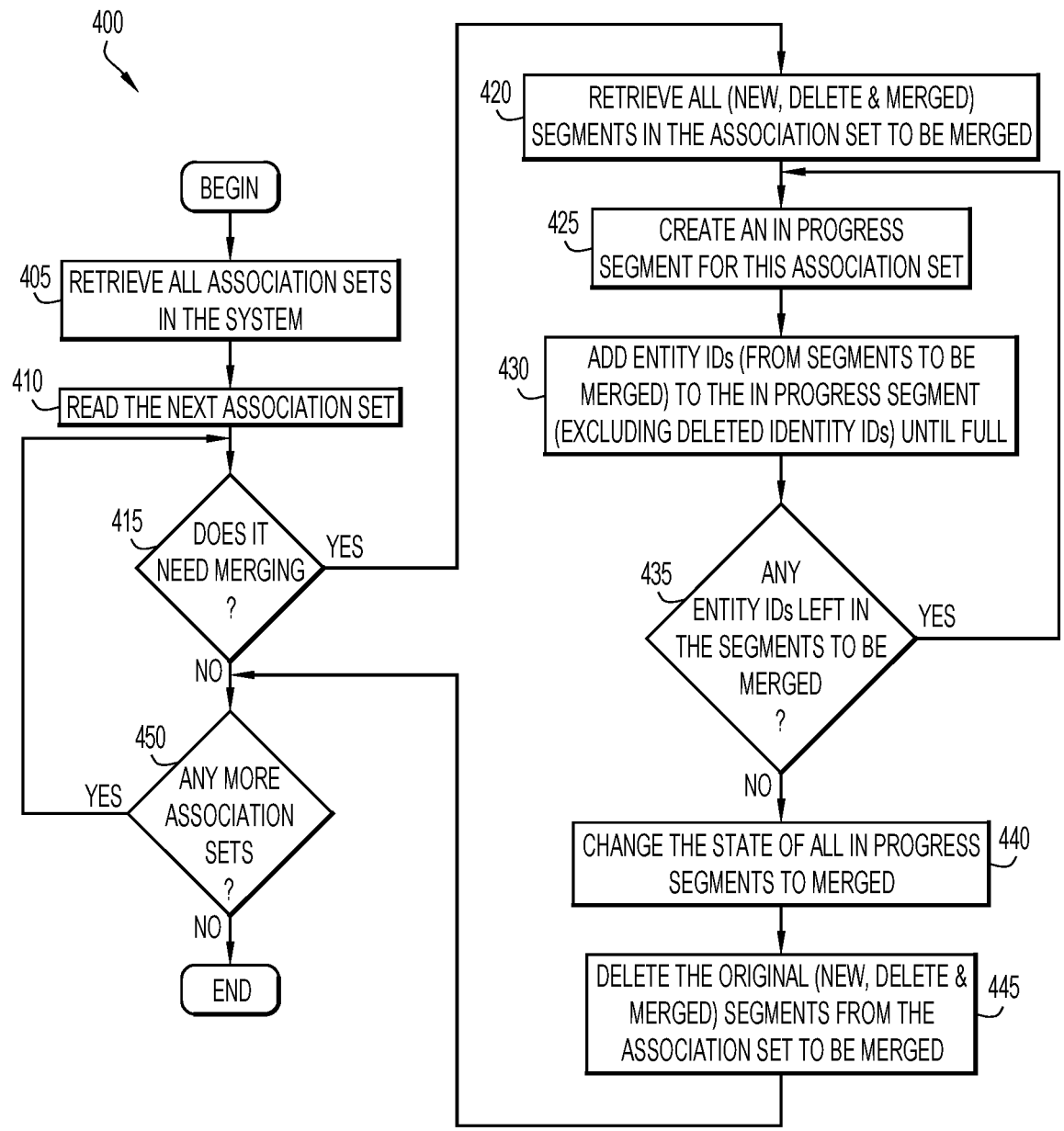
FIG. 4 is a procedural flow chart of a background merger function for merging segments of an association set according to an embodiment of the present invention.

FIG. 4 illustrates a procedural flowchart of the steps taken by the database management module 18 to perform a background merger 400 of multiple segments of an association set. The background merger process 400 merges segments of an association set that are labeled with the states of "NEW," "DELETE," and "MERGED." When performing the background merger process 400, segments are labeled with the state of "IN PROGRESS," as explained below. The background merger process 400 optimizes the segments of an association set by removing duplicate entity identifiers and applying the global deletion set, as previously explained, to segments being merged. The background merger process 400 is lock free, meaning that the association set may still be queried while the database management module 18 performs the background merger process 400 on all or a portion of the segments of an association set.

As illustrated in FIG. 4, the database management module 18 initially, at step 405, retrieves all of the association sets stored within the database 17. At step 410, the database management module 18 reads or analyzes the next association set in the list of association sets received at step 405. When initially reading the list of association sets, the next association set would be the first association set retrieved at step 405. At step 415, the database management module 18 determines whether or not the association set being read at step 410 needs merging. An association set may need merging if the association set contains any segments labeled with the states of "NEW" or "DELETE"

If, at step 415, the database management module 18 determines that the association set needs to be merged, then, at step 420, the database management module 18 retrieves all of the segments in the association set that are labeled with the states of "NEW," "DELETE," and "MERGED." The database management module 18, at step 425, then creates a new segment for the association set, where the new segment is labeled with the state of "IN PROGRESS." At step 430, the database management module 18 adds entity identifiers from the segments retrieved at step 420 to the new IN PROGRESS segment created at step 425. Any entity identifiers that were part of both an association segment and dissociation segment, where the dissociation segment was added to the association set at a later point in time, are not added to the IN PROGRESS segment. Entity identifiers are added to the IN PROGRESS segment at step 430 until the IN PROGRESS segment has reached its maximum number of entity identifiers. At step 435, the database management module 18 determines if any more entity identifiers are still left from the to-be-merged segments of step 420. If, at step 435, the database management module 18 determines that there still entity identifiers that need to be merged, the database management module 18 returns to step 425 to create a new IN PROGRESS segment to which to add the remaining entity identifiers.

However, if at step 435, the database management module 18 determines that all of the entity identifiers have been merged, then, at step 440, the database management module 18 changes the state of all of the IN PROGRESS segments from "IN PROGRESS" to "MERGED." At step 440, the database management module 18 then deletes or removes all of the segments that were previously labeled with the state of "NEW," "DELETE," and "MERGED" from the association set.

The database management module 18, at step 450 then determines if any more association sets are to be merged. If, at step 450, the database management module 18 determines that more association sets need to be merged, the database management module 18 returns to step 410 to read the next association set in the list of retrieved association sets. However, if, at step 450, the database management module 18 determines that no more association sets need to be merged, the database management module 18 ends the background merger process 400.

Figure 5A:
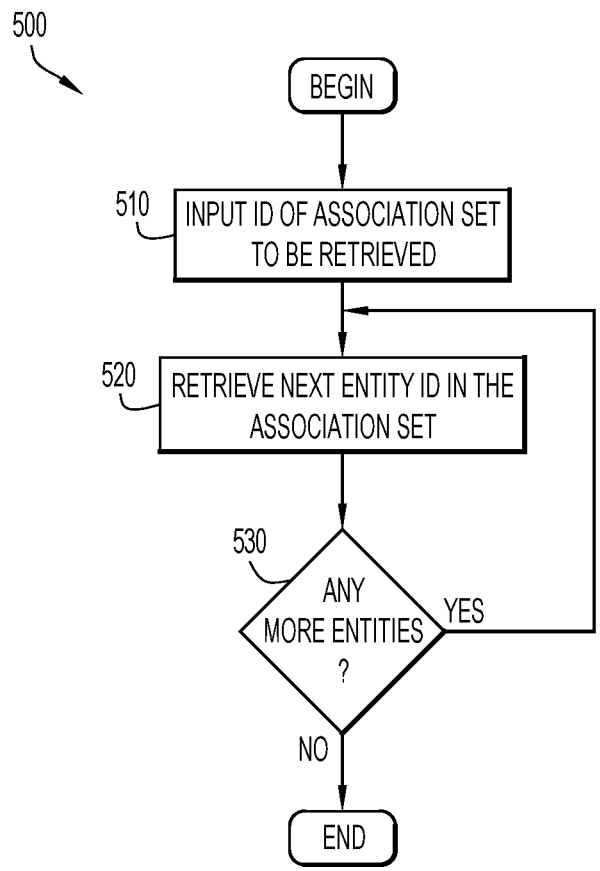
FIG. 5A is a procedural flow chart of a retrieval or query function for retrieving the entities of an association set according to an embodiment of the present invention.
Figure 5B:
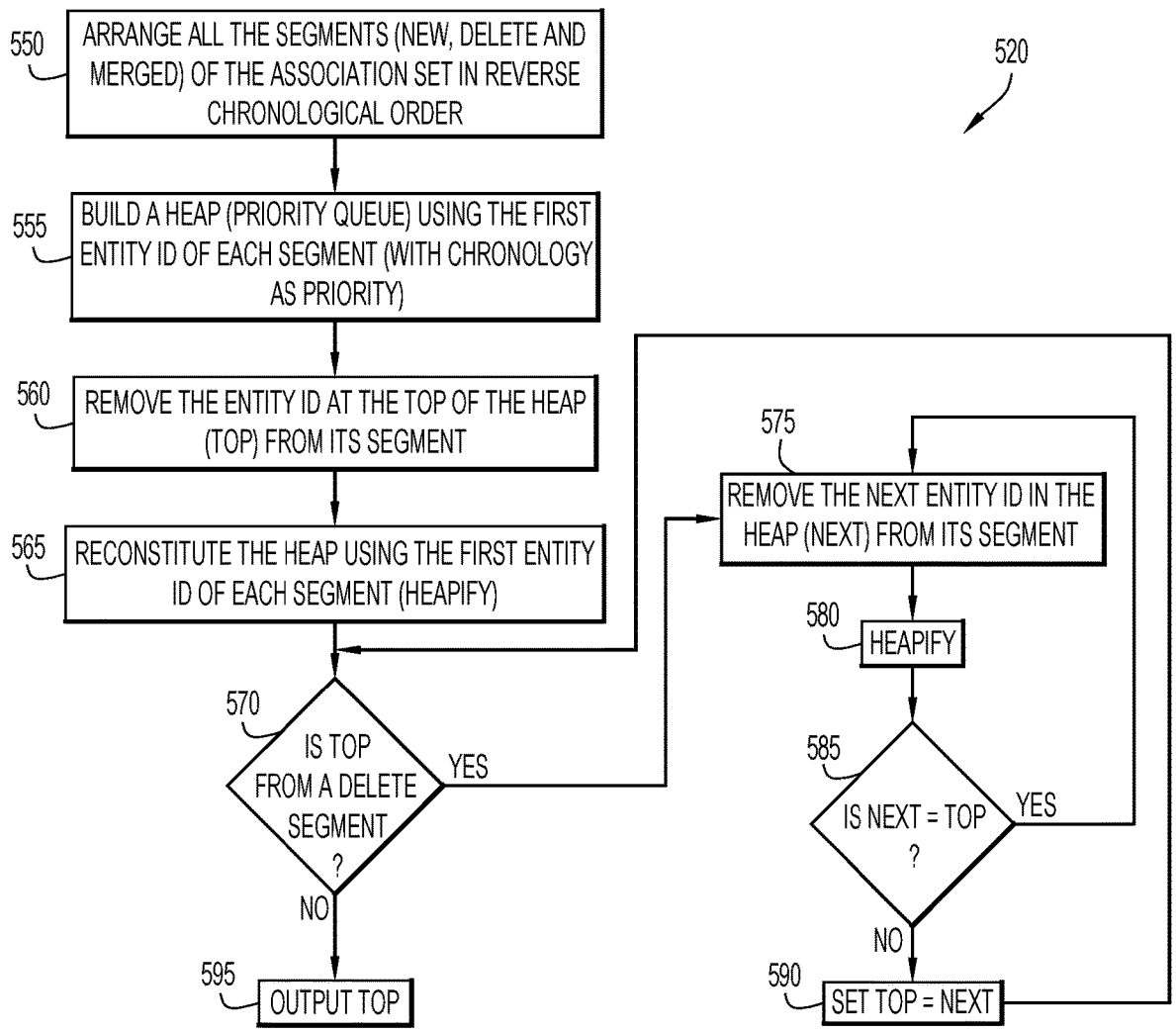
FIG. 5B is a procedural flow chart of a retrieval or query function for retrieving a specific entity of an association set according to an embodiment of the present invention.

With reference now to FIGS. 5A and 5B, illustrated are procedural flowcharts of the steps 500 taken by the database management module 18 to query the database 17 for an association set. As previously explained and illustrated, each segment 110, 120, 130 of an association set 100 is a sorted list of integers that serve as the entity identifiers of entities. In some embodiments, the client systems 20 may, through the database query module 22, send the server system 10 a query for an association set. In other embodiments, the server system 10 may query the database 17 without receiving a query request from the client systems 20. In either of these embodiments, the server system 10 queries the database 17 via the database management module 18.

As illustrated in FIG. 5A, the database management module 18 initially, at step 510, inputs, or receives from the client systems 20, the identifier or identification of the association set to be retrieved from the database 17. At step 520, the database management module 18 retrieves the next entity identifier in the association set that was identified in step 510. When the database management module 18 first attempts to retrieve an entity identifier of an association set, the entity identifier received is the first entity identifier of the association set. However, subsequent attempts to retrieve an entity identifier from an association set by the database management module 18 returns the next entity identifier. At step 530, the database management module 18 determines if any more entities identifiers need to be retrieved from the association set identified and retrieved in step 510. If the database management module 18 determines that more entity identifiers need to be retrieved, the database management module 18 returns to step 520 to retrieve the next entity identifier from the association set. However, if, at step 530, the database management module 18 determines that all of the entity identifiers have been retrieved from the association set, then the query steps 500 are ended by the database management module 18. If the query was received by the client systems 20, the database management module 17 may send the retrieved entity identifiers to the client system from which the query originated.

FIG. 5B depicts a more detailed procedural flowchart of step 520 of the query process 500 depicted in FIG. 5A. More specifically, FIG. 5B depicts the procedural flowchart for retrieving the next entity identifier from an association set. At step 550, the database management module 17 arranges all of the segments (i.e., the segments labeled with the state of "NEW," "DELETE," and "MERGED") of the association set in a reverse chronological order. Thus, as previously explained, the segments of the association set are placed in order of the most recent segment added to the association set to the least recent segment added to the association set. At step 555, the database management module 18 implements a priority queue using the first entity identifier of each segment of the association set. More specifically, the database management module 18 builds a heap of the first entity identifier of each segment, where chronology is the priority. Then, at step 560, the database management module 18 removes the entity identifier that is disposed at the top of the heap from its segment. This removed entity identifier at the top of the heap is the "top" entity identifier. At step 565, the database management module 18 performs a heapify process on the segments, where the database management module 18 reconstitutes the heap using the first entity identifier of each segment after the top entity identifier has been removed from the heap and its associated segment.

At step 570, the database management module 18 determines whether the removed "top" entity identifier is from a dissociation segment (i.e., segment labeled with a state of "DELETE"). If, at step 570, the database management module 18 does determine that the "top" entity identifier is from a deleted or dissociation segment, then the database management module 18, at step 575, removes the "next" entity identifier in the heap from its segment. This "next" entity identifier may be from the same segment as the "top" entity identifier, or may be from any other segment of the association set. Once the "next" entity identifier has been removed from its segment, the database management module 18 at step 580 performs another heapify process on the segments of the association set. Thus, the database management module 18 reconstitutes the heap using the first entity identifier of each segment. At step 585, the database management module 18 verifies that the "next" entity identifier is not equal to the "top" entity identifier. If the database management module 18, at step 585, does determine that the "next" entity identifier is equal to the "top" entity identifier, the database management module 18 returns to step 575 to remove the next entity identifier from the heap. This occurs because, when the "top" entity identifier is equal to the "next" entity identifier, and the "top" entity identifier is from a dissociation segment that was added to the association set 100 more recently than the segment from which the "next" entity identifier was added, the entity represented by that next entity identifier has been dissociated from the association set. Thus, that next entity identifier should not be output from the association set.

However, if the database management module 18, at step 585, does determine that the "next" entity identifier is not equal to the "top" entity identifier, the database management module 18 at step 590 sets the "next" entity identifier as the "top" entity identifier. The database management module 18 then returns to step 570 to determine if the new "top" entity identifier is from a dissociation segment (i.e., segment labeled with a state of "DELETE").

If, at step 570, the database management module 18 determines that the "top" entity identifier is not from a deleted segment, then the database management module 18, at step 595, outputs the value of the "top" entity segment.

Turning to FIGS. 6A-6M is an example embodiment of the process of querying the database 17 for an association set 100 as illustrated by the procedural flowcharts of FIGS. 5A and 5B. In the example embodiment, the association set 600 includes six segments 610, 620, 630, 640, 650, 660. The first segment 610 includes segment header information 612 and segment data information 614. As provided by the segment header information 612, and segment data information 614, the first segment 610 includes entity identifiers of 2, 4, 10, 23, and 30, which are associated with the association set 600. The second segment 620 includes segment header information 622 and segment data information 624. As provided by the segment header information 622, and segment data information 624, the second segment 620 includes entity identifiers of 1, 34, and 50, which are associated with the association set 600. The third segment 630 includes segment header information 632 and segment data information 634. As provided by the segment header information 632, and segment data information 634, the third segment 630 includes entity identifiers of 4, 11, 34, and 56, which are associated with the association set 600. The fourth segment 640 includes segment header information 642 and segment data information 644. As provided by the segment header information 642, and segment data information 644, the fourth segment 640 includes entity identifiers of 2, 11, and 35, which are dissociated from the association set 600. The fifth segment 650 includes segment header information 652 and segment data information 654. However, the fifth segment 650 does not include any entity identifiers, but does dissociate entity identifiers 10 and 11 from the association set 600 because the segment header information 652 captures the contained entity identifiers. Finally, the sixth segment 660 includes segment header information 662 and segment data information 664. However, the sixth segment 660 does not include any entity identifiers, but does associate entity identifier 10 with the association set 600 because the segment header information 662 captures the contained entity identifiers.

As further illustrated in FIGS. 6A-6M, the sixth segment 660 was the most recently added segment to the association set 600, while the first segment 610 was the first segment to be added to the association set 600. Furthermore, each segment 610, 620, 630, 640, 650, 660 also includes a top entity identifier 618, 628, 638, 648, 658, 668, respectively. The top entity identifier 618, 628, 638, 648, 658, 668 for each segment 610, 620, 630, 640, 650, 660 of the association set 600 is the first entity identifier of the respective segment 610, 620, 630, 640, 650, 660, where chronology of the entity identifiers is a priority. In other words, the top entity identifier 618, 628, 638, 648, 658, 668 for each segment 610, 620, 630, 640, 650, 660 of the association set 600 is the lowest value of the entity identifiers of each segment 610, 620, 630, 640, 650, 660.

As illustrated in FIG. 6B, when the database management module 18 performs steps 560, 565, 570, and 595, as illustrated in FIG. 5B, with respect to association set 600, the entity identifier "1" of the second segment 620 is output 670 as the first entity identifier of the association set 600.

Because the entity identifier of "1" is the lowest entity identifier of each of the segments 610, 620, 630, 640, 650, the entity identifier of "1" is the "top" entity identifier of the heap (i.e., the group of the top entity identifiers of each of the 618, 628, 638, 648, 658, 668 for each segment 610, 620, 630, 640, 650, 660). Furthermore, the database management module 18 would determine that the entity identifier "1" is not from a dissociation or DELETE segment (i.e., segments 640, 650), and thus, would output the entity identifier of "1."

Figure 6C:
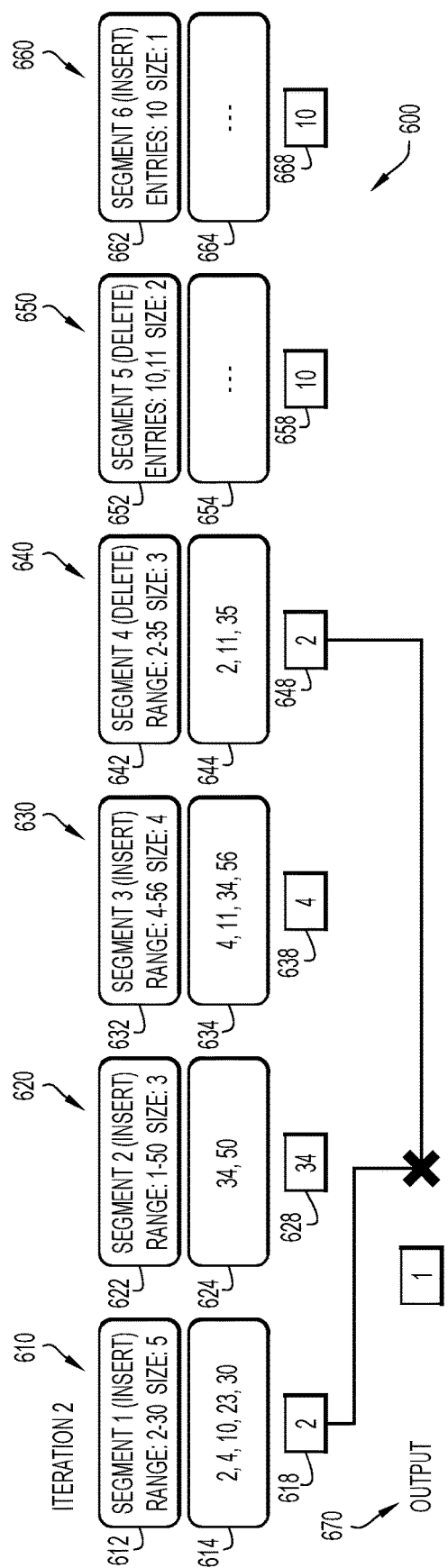

As illustrated in FIG. 6C, once the database management module 18 performs a heapify process after the entity identifier "1" has been removed and output 670, the entity identifier of "34" serves as the as top entity identifier 628 of the second segment 620 because it is the next chronological entity identifier of the second segment 620.

Moreover, when the database management module 18 removes the entity identifier at the top of the heap, two entity identifiers of "2" are present; one from the fourth segment 640 and one from the first segment 610. Because the fourth segment 640 was added more recently than the first segment 610, the entity identifier of "2" from the fourth segment 640 takes precedent or priority over the entity identifier of "2" from the first segment 610. When the database management module 18 evaluates the entity identifier of "2" from the fourth segment 640, the database management module 18 determines that the entity identifier of "2" from the fourth segment 640 is from a DELETE segment (i.e., step 570 of FIG. 5B). In following steps 575, 580, and 585 of the process illustrated in FIG. 5B, the database management module 18 would determine that the next entity identifier is the entity identifier of "2" from the first segment 610. Because the entity identifier of "2" from the first segment 610 is equal to the entity identifier of "2" from the fourth segment 640, and because the entity identifier of "2" from the fourth segment 640 is from a DELETE segment 640 that occurred more recently than the first segment 610, as illustrated in FIG. 6C, the database management module 18 would determine that the entity identifier of "2" would not be output 670.

Figure 6D:
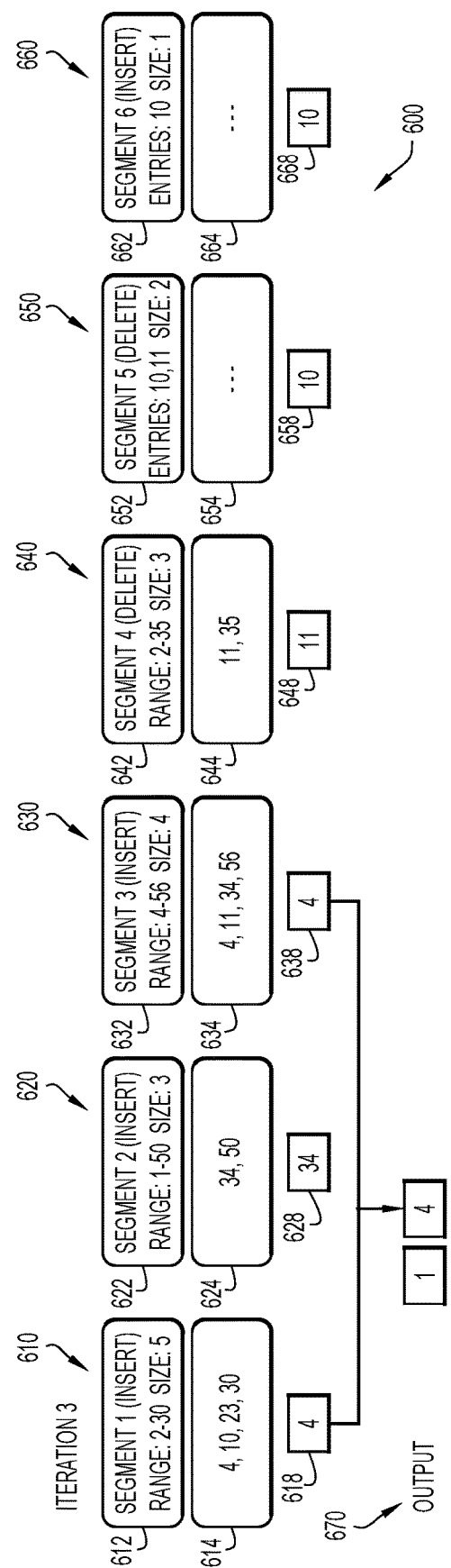

However, as illustrated in FIG. 6D, when the database management module 18 performs the third iteration and removes the next entity identifier from the heap (step 575 of FIG. 5B), the database management module 18 would output the entity identifier of "4" from both the first and third segments 610, 630. As illustrated in FIG. 6D, at the third iteration, the entity identifier of "4" serves as the top entity identifier 618, 638 of the first and third segments 610, 630. Because the entity identifiers of "4" are from the first and third segments 610, 630, and because the first and third segments 610, 630 are both association segments, the database management module 18, at iteration 3, outputs 670 the entity identifier of "4."

Turning to FIG. 6E, when the database management module 18 runs the fourth iteration of the process of FIG. 5B on the association set 600 and removes the entity identifier at the top of the heap, three entity identifiers of "10" are present; one from the first segment 610, one from the fifth segment 650, and one from the sixth segment 660. As illustrated, the fifth segment 650 is a DELETE segment, but the first and sixth segments 610, 660 are association segments (INSERT segments). Because the sixth segment 660 was added more recently than the first segment 610 and the fifth segment 650, the entity identifier of "10" from the sixth segment 660 takes precedent or priority over the entity identifier of "10" from either the first segment 610 or the fifth segment 650. When the database management module 18 evaluates the entity identifier of "10" from the sixth segment 660, the database management module 18 determines that the entity identifier of "10" from the sixth segment 660 is not from a DELETE segment (i.e., step 570 of FIG. 5B). Because the sixth segment 660 is not a DELETE segment, the database management module 18, at iteration 4, would output 670 the entity identifier of "10."

As illustrated in FIG. 6F, when the database management module 18 runs the fifth iteration of the process of FIG. 5B on the association set 600 and removes the entity identifier at the top of the heap, three entity identifiers of "11" are present; one from the third segment 630, one from the fourth segment 640, and one from the fifth segment 650. As illustrated, the fourth and fifth segments 640, 650 are DELETE segments, and the third segment 630 is an association segment. Because both the fifth segment 650 and the fourth segment 640 were added more recently than the third segment 630 to the association set 600, the entity identifier of "11" from the fifth segment 650 takes precedent or priority over the entity identifier of "11" from either the fourth segment 640 or the third segment 630. Thus, when the database management module 18 evaluates the entity identifier of "11" from the fifth segment 650, the database management module 18 determines that the entity identifier of "11" from the fifth segment 650 is from a DELETE segment (i.e., step 570 of FIG. 5B). Because the fifth segment 650 is a DELETE segment, the database management module 18, at iteration 5, would, in following steps 575, 580, and 585 of the process illustrated in FIG. 5B, and determine that the next entity identifiers are the entity identifiers of "11" from the fourth segment 640 and the third segment 630. Because the entity identifiers of "11" from the third and fourth segments 630, 640 are equal to the entity identifier of "11" from the fifth segment 650, and because the entity identifier of "11" from the fifth segment 650 is from a DELETE segment 640 that occurred more recently than the third or fourth segments 630, 640, as illustrated in FIG. 6F, the database management module 18 would determine that the entity identifier of "11" would not be output 670.

Figure 6G:
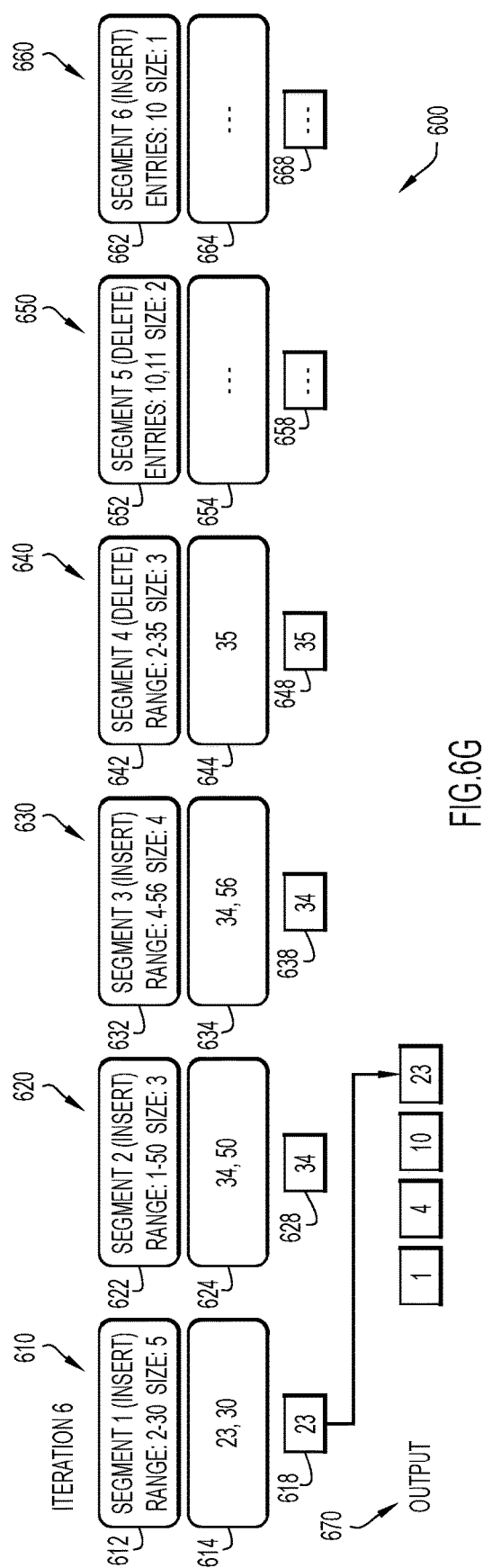

The database management module 18 would continue to repeat the steps 575, 580, and 585 of the process illustrated in FIG. 5B (i.e., remove the next entity identifier from the heap, heapify, and compare the "next" entity identifier to the "top" entity identifier, etc.) until the database management module 18 finds that the next entity identifier does not equal the entity identifier of "11" from the fifth segment 650. As illustrated in FIG. 6G, after evaluating that the entity identifier of "11" should not be output, and after performing a heapify (e.g., step 580 of FIG. 5B), the database management module 18 determines in step 575 of FIG. 5B that the next entity identifier in the heap would be the entity identifier of "23" from the first segment 610. Because the entity identifier of "23" is only found in the first segment 610, and because the first segment 610 is not from a DELETE segment, the database management module 18 would next output 670 the entity identifier of "23."

Figure 6H:
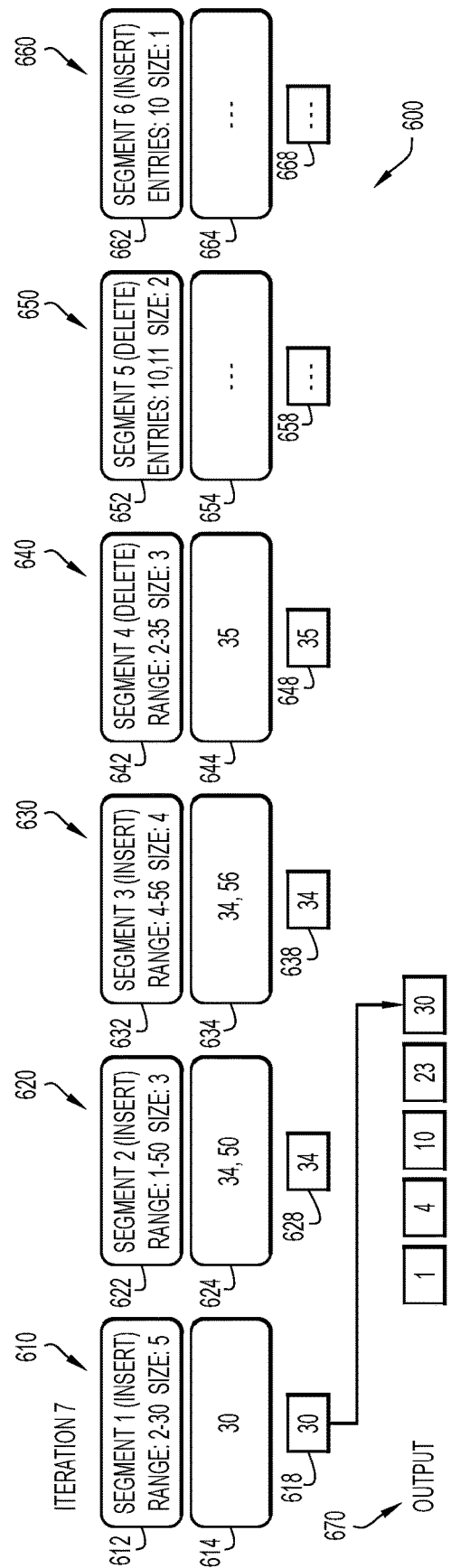

Turning to FIG. 6H, when the database management module 18 runs the seventh iteration of the process of FIG. 5B on the association set 600 and removes the entity identifier at the top of the heap, the database management module 18 would output 670 the entity identifier of "30" from the first segment 610. As illustrated and previously explained, the first segment 610 is not a DELETE segment, and thus, when the database management module 18 evaluates the entity identifier of "30" from the first segment 610, the database management module 18 determines that the entity identifier of "30" from the first segment 610 is not from a DELETE segment (i.e., step 570 of FIG. 5B), and outputs 670 the entity identifier of "30."

Similarly, as illustrated in FIG. 6I, when the database management module 18 runs the eighth iteration of the process of FIG. 5B on the association set 600 and removes the entity identifier at the top of the heap, the database management module 18 would find that the second and third segments 620, 630 both include the entity identifier of "34." As illustrated, the third segment 630 was added to the association set 600 more recently than the second segment 620, and takes precedent or priority over the second segment 620. Furthermore, both the second and third segments 620, 630 are association segments. Thus, when the database management module 18 evaluates the entity identifier of "34" from the third segment 630, the database management module 18 determines that the entity identifier of "34" from the third segment 630 is not from a DELETE segment (i.e., step 570 of FIG. 5B), and outputs 670 the entity identifier of "34."

Turning to FIG. 6J, once the database management module 18 performs a heapify process after the entity identifier "34" has been removed and output, the entity identifiers of "50," "56," and "35" from the second, third, and fourth segments 620, 630, 640, respectively, are the entity identifiers left in the heap. Because the entity identifier of "35" from the fourth segment 640 would be at the top of the heap, the database management module 18 removes the entity identifier of "35" from the fourth segment 640 from the heap to be evaluated. When the database management module 18 evaluates the entity identifier of "35" from the fourth segment 640, the database management module 18 determines that the entity identifier of "35" from the fourth segment 640 is from a DELETE segment (i.e., step 570 of FIG. 5B) and thus, cannot be output 670.

In following steps 575, 580, and 585 of the process illustrated in FIG. 5B, the database management module 18 would determine that the next entity identifier is the entity identifier of "50" from the second segment 620, as illustrated in FIG. 6K. Because the entity identifier of "50" from the second segment 620 is not equal to the entity identifier of "35" from the fourth segment 640, the database management module 18 would set the "top" entity identifier to the entity identifier of "50" from the second segment 620. The database management module 18 then, at step 570 of the process illustrated in FIG. 5B, evaluates whether the entity identifier of "50" from the second segment 620 is from a DELETE segment. Because the second segment 620 is an association segment and not a DELETE segment, the database management module 18 outputs 670 the entity identifier of "50."

Finally, as illustrated in FIG. 6L, when the database management module 18 runs the eleventh iteration of the process of FIG. 5B on the association set 600 and removes the entity identifier at the top of the heap, the database management module 18 would output 670 the entity identifier of "56" from the third segment 630. As illustrated, the entity identifier of "56" is the only entity identifier that is left to be evaluated. Furthermore, the third segment 630 is not a DELETE segment, and thus, when the database management module 18 evaluates the entity identifier of "56" from the third segment 630, the database management module 18 determines that the entity identifier of "56" from the third segment 630 is not from a DELETE segment (i.e., step 570 of FIG. 5B), and outputs 670 the entity identifier of "56."

Figure 6M:
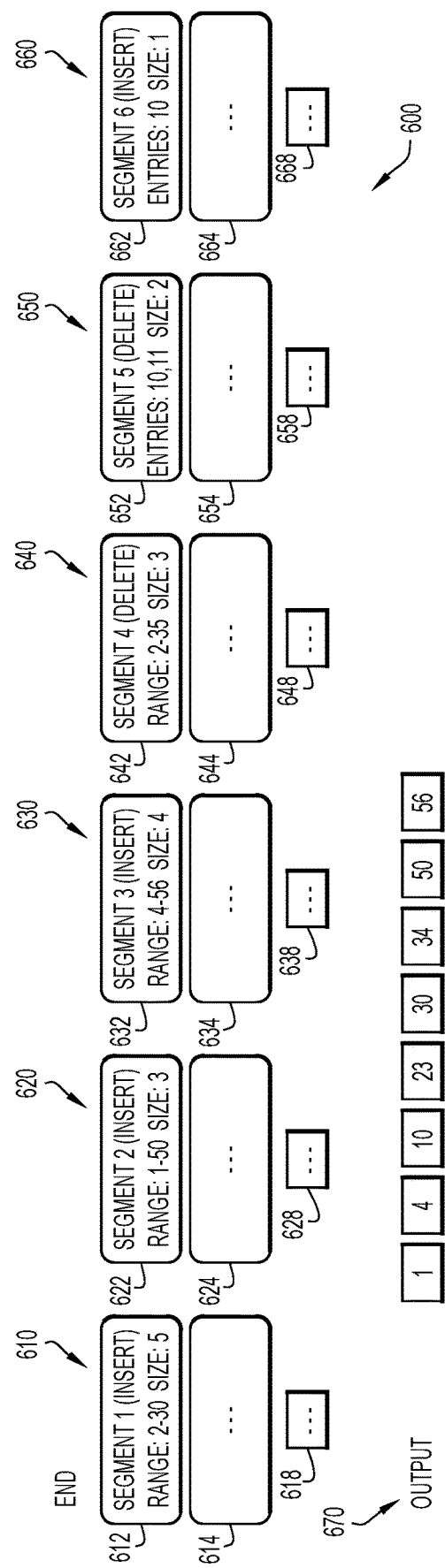

FIG. 6M illustrates the final output 670 when the database management module 18 queries the association set 600 illustrated in FIGS. 6A-6M. The entity identifiers output 670, when the association set 600 is queried, are "1," "4," "10," "23," "30," "34," "50," and "56."

The client systems 20 may request, through the database query module 22, the database management module 18 of the server systems 10 to query the database 17 for a variety of reasons. For example, the database 17 may contain an association set of the documents that are on hold for a litigation matter, and thus, when determining whether a given document is on hold, the association set can be queried to examine whether the given document is among them. In another example, an association set may be queried to determine how many documents are relevant to a given case, matter, or project. For this example, if all the association and dissociation segments for an association set have been merged, a simple count of the number of entities in the set provides the answer to the query, where multiplying the number of full segments by segment size speeds up the calculation. In another example, an association set may be queried to determine which documents were added to a given case before a given date. For this example, if the association date is stored within the association table as a payload rather than a separate table, the query can be quickly and efficiently answered. The query can first retrieve all documents in an association set and then those documents can be post-filtered based on the date in which the documents were added. In yet another example, an association set may be queried to determine which documents are owned by one or more of a given set of custodians. In this example, if the data is modeled as a document containing an association set of all its owners (e.g., custodians), the query can be completed by scanning each document and performing an association set intersection operation between the association sets of all of the owners of the document and the set of custodians in the query.

By virtue of having association sets with both association segments and dissociation segments, no segment of any association set needs to be modified. Each of the segments of an association set are immutable, which allows operations such as creation, deletion, movement, merging, and querying of segments to occur concurrently without having to lock the entire association set for any one of the operations. Since each row in the segment data table 150 illustrated in FIG. 2 denotes one segment of the association set 100, the scope of a transactional lock is often just one row, not the entire table. For example, when using a link table approach, an association set of size 100,000 would require the entire link table to be locked (i.e., 100,000 rows) for any operation involving associations. However, when using the present invention embodiments, if a segment of an association set represents only 5,000 entity identifiers, only one row (i.e., about 5,000 entity identifiers) needs to be locked when subject to the operation. Thus, other operations involving associations of entity identifiers in other segments can take place at the same time without any concurrency issues.

Furthermore, in some present invention embodiments, when a segment of an association set needs to be read, it is loaded from disk, decompressed, and cached in memory to speed up subsequent access. Weak references are used to store these segments in memory so if memory utilization is high, these segments can be discarded (e.g., by a garbage collector) to free up memory for other threads. While this can result in the segment having to be reloaded (e.g., from disk) the next time the segment is needed, this approach can improve the overall scalability of the system.

The techniques provided herein have a number of advantages. As one example, the techniques enable association sets to be queried in a fast, efficient, and cost effective manner. Moreover, the techniques provided herein provide a system that enables large association sets to be modeled and tracked in an efficient and fast manner. This new system eliminates the costs associated with other traditional association sets, such as link table association sets. The system is further capable of modifying the entities of an association set without requiring whole association sets to be locked and unusable during the modification. Put generally, the techniques provided herein resolve technical and economical problems that are necessarily rooted in computer technology and, in particular, the storage of association sets within a database.

It will be appreciated that the embodiments described above and illustrated in the drawings represent only a few of the many ways of implementing embodiments for processing a database query for sets of data, and especially association sets of data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, database management module 18, database query module 22, etc.). These systems may include any types of monitors and input devices (e.g., keyboard, mouse, voice recognition, etc.) to enter and/or view information.

It is to be understood that the software (e.g., database management module 18, database query module 22, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., database management module 18, database query module 22, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., association sets, association segments, dissociation segments, entity identifiers, metadata, etc.). The database system may be implemented by any number of any conventional or other databases, data stores or storage structures (e.g., files, databases, data structures, data or other repositories, etc.) to store information (e.g., association sets, association segments, dissociation segments, entity identifiers, metadata, etc.). The database system may be included within or coupled to the server and/or client systems. The database systems and/or storage structures may be remote from or local to the computer or other processing systems, and may store any desired data (e.g., association sets, association segments, dissociation segments, entity identifiers, metadata, etc.).

The present invention embodiments may employ any number of any type of user interface (e.g., Graphical User Interface (GUI), command-line, prompt, etc.) for obtaining or providing information (e.g., entity identifiers of an association set, date the entity identifiers were added to the association set, date the entity identifiers were added to the association set, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing a database query for sets of data comprising:
   assigning a unique identifier from an integer space to each entity within data and creating one or more sets of first entities of a first type with each set relating the first entities to a corresponding second entity of a second different type within the data;
   partitioning a set of first entities represented by the unique identifiers of the first entities of the set into a plurality of segments each including the unique identifiers of one or more first entities of the set, wherein at least one segment is an insert type to indicate association and addition of the one or more first entities of the at least one segment with the set and at least one other segment is a delete type to indicate dissociation and removal of the one or more first entities of the at least one other segment from the set, wherein a segment size is based on a request size, compression type, and run-time optimizations, and wherein the plurality of segments are used to generate content of the set of first entities by merging, inserting, and deleting segments;
   generating a representation on disk for each set of first entities, wherein each representation encompasses and is suited for a range of the unique identifiers of first entities within a corresponding set and indicates a presence of a first entity within that corresponding set; and
   processing a query for the first entities associated with a second entity based on the representation for each set of first entities to retrieve the first entities satisfying the query by evaluating the query for the plurality of segments and combining results from each of the evaluated segments based on the first entities within the insert type and delete type segments.

2. The method of claim 1, wherein at least one set of first entities includes first entities associated with a specific second entity.

3. The method of claim 1, wherein at least one set of first entities includes first entities dissociated with a specific second entity.

4. The method of claim 1, wherein metadata for an entity identifier of a segment of a set of first entities is stored inline with the segment as a payload.

5. The method of claim 1, wherein content of each segment and metadata for each segment is stored in separate data objects, and wherein the plurality of segments are chronologically ordered; and
   wherein the method further comprises performing operations on the plurality of segments concurrently.

6. The method of claim 1, wherein a set of first entities includes a multi-set containing non-unique entities with duplicate entity identifiers preserved in a physical representation of that set of first entities, and wherein the query requests the set or multi-set representation.

7. A system for processing a database query for sets of data comprising:
   a processor configured to:
      assign a unique identifier from an integer space to each entity within data and create one or more sets of first entities of a first type with each set relating the first entities to a corresponding second entity of a second different type within the data;
      partition a set of first entities represented by the unique identifiers of the first entities of the set into a plurality of segments each including the unique identifiers of one or more first entities of the set, wherein at least one segment is an insert type to indicate association and addition of the one or more first entities of the at least one segment with the set and at least one other segment is a delete type to indicate dissociation and removal of the one or more first entities of the at least one other segment from the set, wherein a segment size is based on a request size, compression type, and run-time optimizations, and wherein the plurality of segments are used to generate content of the set of first entities by merging, inserting, and deleting segments;
      generate a representation on disk for each set of first entities, wherein each representation encompasses and is suited for a range of the unique identifiers of first entities within a corresponding set and indicates a presence of a first entity within that corresponding set; and
      process a query for the first entities associated with a second entity based on the representation for each set of first entities to retrieve the first entities satisfying the query by evaluating the query for the plurality of segments and combining results from each of the evaluated segments based on the first entities within the insert type and delete type segments.

8. The system of claim 7, wherein at least one set of first entities includes first entities associated with a specific second entity.

9. The system of claim 7, wherein at least one set of first entities includes first entities dissociated with a specific second entity.

10. The system of claim 7, wherein metadata for an entity identifier of a segment of a set of first entities is stored inline with the segment as a payload.

11. The system of claim 7, wherein content of each segment and metadata for each segment is stored in separate data objects, and wherein the plurality of segments are chronologically ordered; and
   wherein the processor is further configured to perform operations on the plurality of segments concurrently.

12. The system of claim 7, wherein a set of first entities includes a multi-set containing non-unique entities with duplicate entity identifiers preserved in a physical representation of that set of first entities, and wherein the query requests the set or multi-set representation.

13. A computer program product for processing a database query for sets of data, the computer program product comprising one or more computer readable storage media collectively having program instructions embodied therewith, the program instructions executable by a processor to cause the processor to:

assign a unique identifier from an integer space to each entity within data and create one or more sets of first entities of a first type with each set relating the first entities to a corresponding second entity of a second different type within the data;

partition a set of first entities represented by the unique identifiers of the first entities of the set into a plurality of segments each including the unique identifiers of one or more first entities of the set, wherein at least one segment is an insert type to indicate association and addition of the one or more first entities of the at least one segment with the set and at least one other segment is a delete type to indicate dissociation and removal of the one or more first entities of the at least one other segment from the set, wherein a segment size is based on a request size, compression type, and run-time optimizations, and wherein the plurality of segments are used to generate content of the set of first entities by merging, inserting, and deleting segments;

generate a representation on disk for each set of first entities, wherein each representation encompasses and is suited for a range of the unique identifiers of first entities within a corresponding set and indicates a presence of a first entity within that corresponding set; and process a query for the first entities associated with a second entity based on the representation for each set of first entities to retrieve the first entities satisfying the query by evaluating the query for the plurality of segments and combining results from each of the evaluated segments based on the first entities within the insert type and delete type segments.

14. The computer program product of claim 13, wherein at least one set of first entities includes first entities associated with a specific second entity.

15. The computer program product of claim 13, wherein at least one set of first entities includes first entities dissociated with a specific second entity.

16. The computer program product of claim 13, wherein metadata for an entity identifier of a segment of a set of first entities is stored inline with the segment as a payload.

17. The computer program product of claim 13, wherein content of each segment and metadata for each segment is stored in separate data objects, and wherein the plurality of segments are chronologically ordered; and wherein the program instructions further cause the processor to perform operations on the plurality of segments concurrently.

18. The computer program product of claim 13, wherein a set of first entities includes a multi-set containing non-unique entities with duplicate entity identifiers preserved in a physical representation of that set of first entities, and wherein the query requests the set or multi-set representation.

19. The method of claim 1, wherein the first type is a type selected from a group of a person, a document, and an event, and the second different type is another type selected from that group that is different from the first type.

20. The system of claim 7, wherein the first type is a type selected from a group of a person, a document, and an event, and the second different type is another type selected from that group that is different from the first type.

21. The computer program product of claim 13, wherein the first type is a type selected from a group of a person, a document, and an event, and the second different type is another type selected from that group that is different from the first type.

* * * * *